July 21, 1964 D. BRETON ETAL 3,141,342

MECHANICAL OSCILLATOR

Filed Oct. 4, 1960 2 Sheets-Sheet 1

INVENTORS
DENIS BRETON
JEAN CLAUDE CARRE

BY Bacon & Thomas
ATTORNEYS

MECHANICAL OSCILLATOR

Filed Oct. 4, 1960 2 Sheets-Sheet 2

INVENTORS
DENIS BRETON
JEAN CLAUDE CARRE
BY Baron & Thomas
ATTORNEYS 3,141,342
MECHANICAL OSCILLATOR Denis Breton, 86 Ave. de la Republique, Montrouge, France, and Jean Claude Carre, 24 Blvd. de Jardy, Vaucresson, France Filed Oct. 4, 1960, Ser. No. 60,324
Claims priority, application France Oct. 30, 1959
11 Claims. (Cl. 74—40)

The present invention has for its object a mechanical oscillator enabling oscillations which are sinusoidal in time or oscillations which are square in time to be obtained at will.

Known mechanical systems (crank, connecting rod, slide, etc.) enable movements having an oscillation which is sinusoidal in time to be obtained. These devices, however, do not enable two different forms of oscillation to be obtained: a sinusoidal oscillation and an oscillation of different form, square for example.

However, a device is known which delivers sinusoidal or square oscillations at will; this device consists of a sliding bar provided with driving means for causing it to oscillate sinusoidally and comprising a stop on its lower portion and another stop on its upper portion. An associated electric circuit comprises a general switch which can be actuated by the operator. The bar closes alternately two electric contacts of said circuit, each followed by an automatic time switch. This permits the intervention of other driving means (comprising an electric motor), when the general switch is closed, a certain given time after the closing of the electric contacts. These other driving means supply square oscillations to the oscillating bar. Such a device, however, does not afford reliable and accurate operation. For example, any misadjustment of the automatic time switch results in an alteration of the cycle of oscillations.

The mechanical oscillator according to the invention remedies the drawbacks of the above-mentioned oscillators and permits great flexibility of operation.

Said mechanical oscillator is characterised essentially in that a motor of known type drives with a sinusoidal movement, through the intermediary of a plate having an adjustable crank pin, one end of an arm which pivots intermediate its ends about a fixed point, the other end of said arm being rendered fast in periodical fashion, by suitable means, with a second arm, one end of which pivots about the same fixed point, while the other end is connected to the member to be moved.

According to a particular embodiment of the invention, the periodicity of the entrainment of the second arm by the first is controlled through the intermediary of an electric circuit by a cam connected to the motor. The action of said cam can be nullified at will by opening said electric circuit.

In order that the present invention may be well understood there will now be described an embodiment thereof given by way of example only reference being had to the accompanying drawings in which.

Only those elements necessary for understanding the invention are shown in the figures, the corresponding elements in these different figures bearing identical reference numerals.

Figure 1:
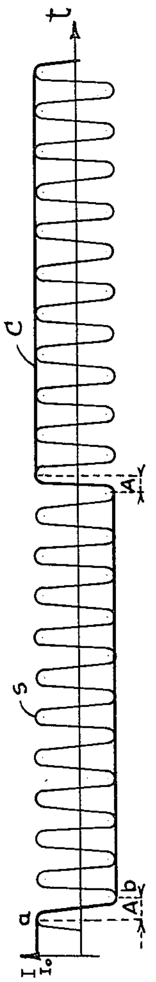
FIGURE 1 is a diagram showing the two types of oscillation obtained by means of the oscillator described in this example.

FIGURE 1 shows the two types of oscillation obtained by means of the mechanical oscillator. The deflections I of the member to be moved are shown as ordinates, the time of abscissae. The sinusoidal oscillations (curve S) have an amplitude $I_0$ which may vary from ½ centimetre to 60 centimetres and a period which may vary from 1 to 120 seconds, passing through ten predetermined intermediate values. Each amplitude may be used with all the periods.

As there cannot be any question, in any case, of obtaining practically speaking square oscillations with a time of ascent which is almost nil, one is led to obtain these oscillations (curve C) in accordance with the diagram shown in FIGURE 1. The time of transit A between the flat portions of the square oscillations shown elapses along a portion of a sinusoid *ab*, A presenting about 5% of a period of the square oscillations. The amplitude of the square oscillation may vary from 10 to 60 centimetres and the period may vary between 21 seconds and 2,520 seconds. Between these two limits, ten other possible values are provided. A period of the square oscillations corresponds, in the case of FIGURE 1, to twenty-one periods of the sinusoidal oscillation.

Figures 2, 4:
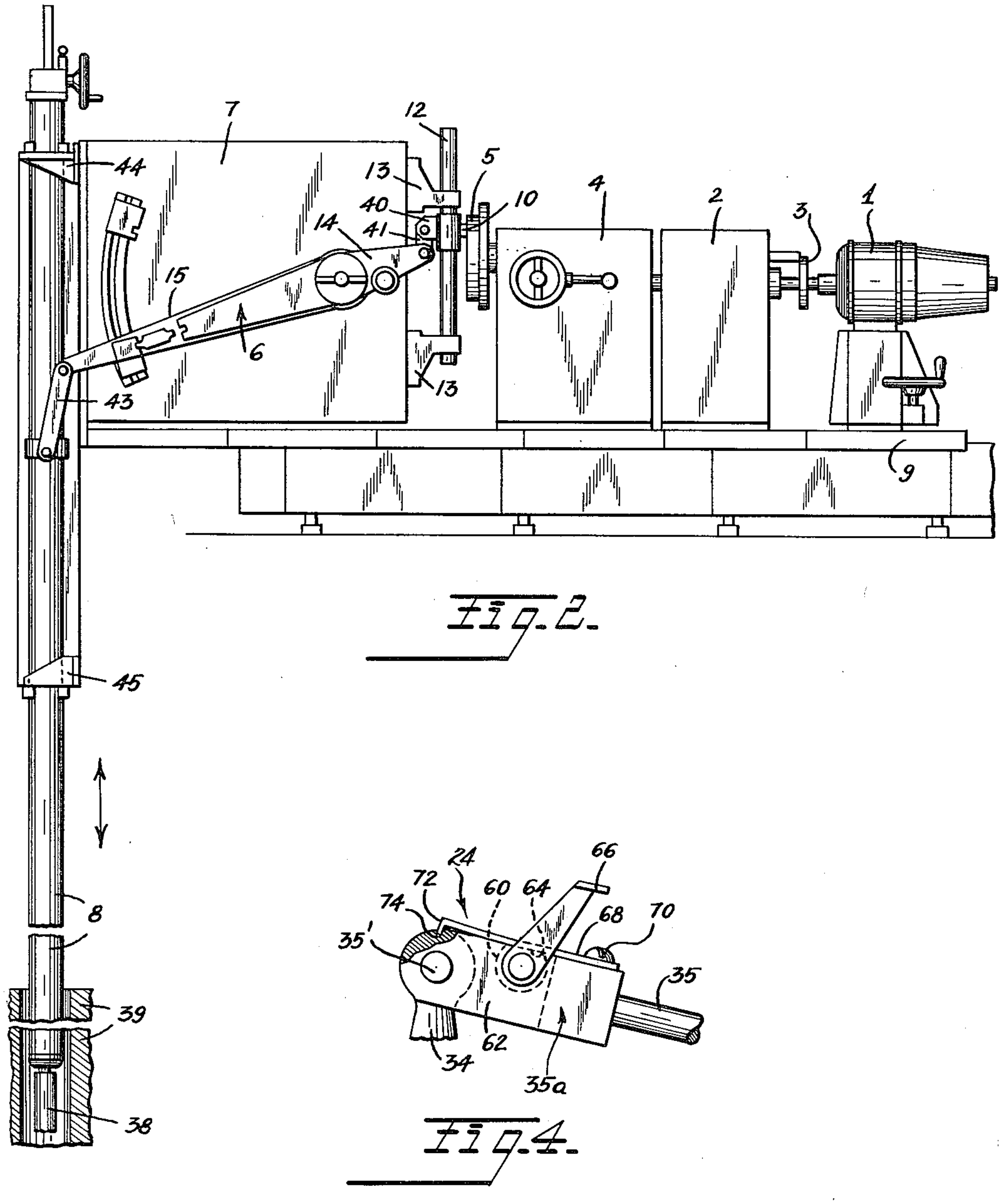
FIGURE 2 is a general view of an installation comprising said oscillator.
FIG. 4 is an enlarged, side view, partly broken away, showing a device for selectively locking a pivot connection between two members against relative movement.

FIGURE 2 shows a synchronous motor 1 supplied with a stabilised three-phase current and connected to a gear box 2 through the intermediary, for example, of a coupling of the Oldham type 3. A connecting box 4 (inside which there is a cam whose function will be described hereinafter) causes a crank-pin plate 5 to rotate, said plate driving the oscillation mechanism 6 fixed to a support 7.

The oscillation mechanism 6 transmits the sinusoidal or square movement to the oscillating bar 8 to which there is attached, for example, a sample-holding tube 38. This bar is suitably guided in bearings 44 and 45. The whole of the oscillating apparatus is fixed to a slide carriage 9 permitting a longitudinal movement the total length of which is seventy-five centimetres. A footbridge (not shown) fixed to the carriage facilitates access to the adjusting means.

In the two types of oscillation, the position of the bar 8 and of the tube 38 may therefore vary, in height, up to thirty centimetres on either side of a fixed reference point, for example the centre of the heart (or active part) 39 of an atomic reactor.

Figure 3:
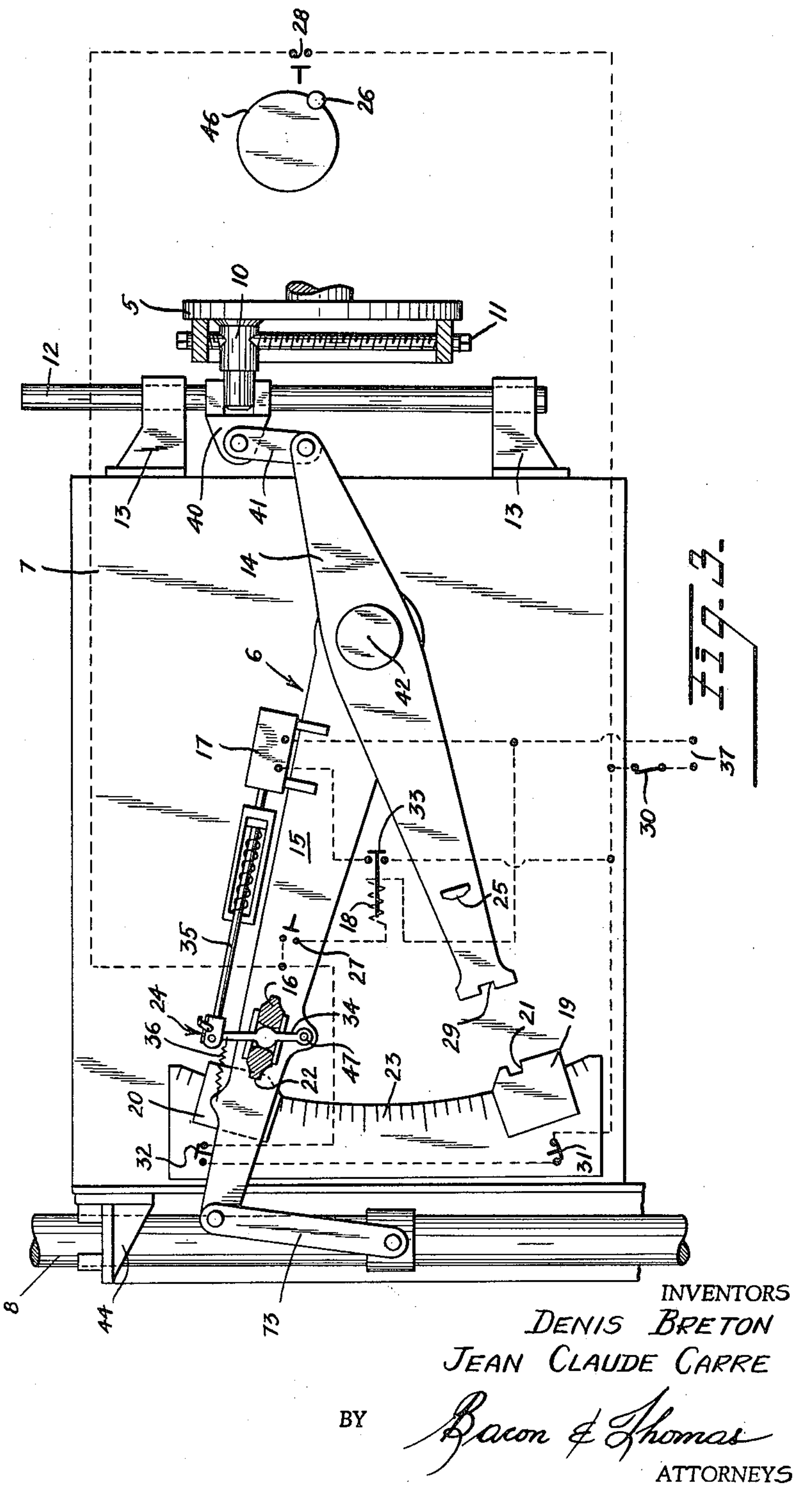
FIGURE 3 shows said oscillator partly in section and partly in external view.

In FIGURE 3 there will be seen the operating mechanism of the mechanical oscillator. This mechanism is driven through the plate 5 by a crank pin 10 adjustably mounted on the plate, the distance of the pin from the centre of the plate being adjustable by means of a screw system 11. In this way, it is possible to carry out adjustment of the amplitudes. The crank pin 10 drives a slide 12 which moves vertically guided by two bearings 13 fixed to the support 7. Since the plate 5 rotates at an adjustable constant speed, the slide 12 performs a rectilinear movement which is sinusoidal in time.

The oscillating arm is formed of two parts: on the one hand a control arm 14, which receives the sinusoidal oscillations transmitted by the slide 12, and, on the other hand, the bar-supporting arm 15. Connection of the control arm 14 with the crank pin 10 is effected through the intermediary of a link 41 articulated on the one hand to said arm and, on the other hand, to a part of a fork 40 fast with the slide 12, between the sides of which fork the crank pin 10 is engaged. The arm 14 can oscillate about the axis 42. The bar-supporting arm 15 can oscillate about the same axis 42, which passes through one of the ends of that arm. The other end of the bar-supporting arm 15 transmits the oscillations of said arm to the bar 8 through the intermediary of the link 43. The two arms 14 and 15 can be connected by a movable key 16 carried by the arm 15 and controlled by an electromagnet 17 through the intermediary of a relay 18 comprising a contact 33.

Two sliders or holding elements 19 and 20 are clamped by suitable means, not shown, on a graduated segment 23 fixed to the support 7. The position of these sliders on said graduated segment is adjustable and each of the sliders has a notch 21 and 22, respectively for receiving the key 16.

The control arm 14 likewise includes a notch 29 for receiving key 16.

A locking device 24 of any suitable, conventional type is employed to secure the movable key 16 locked in position in the notch 29. Said key 16 is actuated to move from either notch 21 or 22 into the notch 29 by an electromagnet 17 through the intermediary of a rod 35 fast with the core of said electromagnet and a lever 34 articulated at 47 to the arm 15 and acting directly on the key 16. The rod 35 and the lever 34 are pivotally connected as at 35′, with the upper end of the lever 34 received between the sides of a U-shaped clevis 35*a*, which is rigidly attached to the end of the rod 35, as shown. The locking device 24, which may be, for example, similar to the hinge lock shown in the patent to Gage, 1,226,324, may be manually engaged to lock the lever 34 against pivotal movement with respect to the rod 35 to maintain the key 16 engaged in the notch 29. The locking device includes a generally cylindrical cam member 60, supported in suitable openings formed in the parallel side members 62 of the U-shaped clevis 35*a*. The cam member 60 is provided with a flat surface 64 and may be manually rotated in the clevis member 35*a* by means of a handle 66 rigidly attached to one end thereto. A flat spring member 68, secured at one end thereof to the upper surface of the clevis member 35*a* by a screw 70, is provided at the other end with a laterally extending hook portion 72. A recess 74 is formed in the end of the lever 34 in such a position that it cooperates with the hooked end 72 of the spring 68 to lock the lever 34 to the rod 35 with the key 16 engaged in the notch 29. When the locking device 24 is in the locked position, as illustrated in FIG. 4, the spring 68 bears on the flat portion 64 of the cam 60. When it is desired to unlock the device 24 to permit pivotal movement of the lever 34 with respect to the rod 35 and to permit the key 16 to be disengaged from the notch 29, the cam 60 is manually rotated by means of the handle 66 to bring the circular portion of the cam into engagement with the spring 68 and thus raise the hooked end 72 of the spring upwardly out of the recess 74. A return spring 36 is fixed at one end thereof to the arm 15 and at the other end thereof to the lever 34 for disengaging the key 16 from the notch 29. As will be apparent to one skilled in the art, the key 16 may be secured and retained in engagement in the notch 29 by means other than that described and disclosed. For example, a suitable manually operated latch could be mounted on the arm 15 adjacent the key 16 and cooperate with the key to lock it in the notch 29 or a separate electrical circuit could be connected to the electromagnet 17, to be completed when switch 30 is open, to maintain 17 in the actuated condition with the key 16 engaged in the notch 29.

Two cams 25 and 26, the first located on the control arm 14 and the second on a wheel 46 (shown diagrammatically in FIGURE 3) of the connecting box 4 (FIGURE 2) control the electric contacts 27 and 28.

Two electric contacts 31 and 32 located on the graduated segment 23 are controlled by the movement of the bar-supporting arm 15. A voltage applied at 37 supplies the contacts, 27, 28, 31, 32, 33, the relay 18 and the electromagnet 17. The complete electric circuit, which is shown in dash lines, moreover comprises a switch 30 which can be actuated by the operator.

The mechanical oscillator which has just been described enables either sinusoidal oscillations or square oscillations to be obtained.

For operation with sinusoidal oscillations, the two parts of the oscillating arm, that is to say, the control arm 14 and the bar-supporting arm 15, are rendered fast with one another, this being achieved by locking the key 16 in the appropriate position, that is to say engaged in the notch 29, by means of the locking device 24. The switch 30 must be open.

Through the intermediary of the gear box 2 and the connecting box 4, the motor 1 rotates the plate 5 provided with the crank pin 10. The latter drives the slide 12 in a rectilinear movement which is sinusoidal in time. The oscillating arm, formed by the two parts (the control arm 14 and the bar-supporting arm 15 which are rendered fast with one another), transmits the sinusoidal movement of the slide, after having amplified it (in a ratio of three to one in this particular assembly), to the oscillating bar 8. At the end of the latter there is the sample-holding tube 38 (FIGURE 2), which thus performs sinusoidal oscillations.

It is to be observed that the crank pin 10 of the plate 5 could cause the control arm 14 to oscillate sinusoidally by means of a connection of different type. For example, it would be necessary for the axis of the plate 5 to be parallel to the axis 42 of the arm 14, one of the ends of which would form a fork between whose sides the crank pin 10 would slide.

Adjustment of the amplitude of the sinusoidal oscillations must be carried out when the motor 1 is stopped. A manual control is provided for this purpose. The screw 11 is brought into the vertical position by rotating the plate 5, an index and a reference mark, not shown, for example, enabling it to be ascertained whether the screw is in fact in the desired position. The eccentricity of the crank pin 10 is then adjusted by operating the screw 11. A pointer, not shown fast with the crank pin 10 and moving over a scale located on the plate enables this operation to be checked. The adjustment of the period of the sinusoidal oscillations is carried out by means of the gear box 2. With the driving motor rotating at a constant speed, a decrease in the gear ratio results in a period increase. Inversely, any increase in the gear ratio results in a period decrease.

Operation of the mechanical oscillator with square oscillations is obtained when the switch 30 is closed and the locking device 24 is not engaged. Assuming that the initial position of the bar-supporting arm 15 is that shown in FIGURE 3, the key 16, which is carried by the arm 15, is engaged under the action of the return spring 36, the locking device 24 not being locked, in the notch 22 of the slider 20 disposed on the fixed segment 23. The bar-supporting arm 15 is then immovable. The contact 31 is closed, the contact 32 is open. The crank-pin plate 5 is set in motion by the motor 1 and only the control arm 14 performs sinusoidal oscillations S in accordance with the diagram of FIGURE 1.

At each oscillation, the cam 25 closes the electric contact 27. Nothing happens, because the contact 28, on the one hand, and the contact 32, on the other hand, are open. The cam 26, which is disposed inside the connecting box 4, rotates with a slow uniform movement (one complete revolution of the wheel 46 corresponds to ten and a half oscillations of the arm 14 in the present case, corresponding to the diagram of FIGURE 1).

At a certain instant, the cam 26 closes the contact 28. At the instant when, for the first time after the closing of the contact 28, the cam 25 closes the contact 27, the energisation of the relay 18 is obtained. This relay then closes the contact 33, which permits energisation of the electromagnet 17. The key 16 leaves the notch 22 of the slider 20 and enters the notch 29 of the control arm.

The bar-supporting arm 15 is then driven or entrained by the arm 14, the result of which is to close the contact 32. At this moment only the slowly rotating cam 26 ceases to close the contact 28. Since the contacts 27, 31 and 32 are closed, the energisation of the relay 18 is maintained, as is also, consequently, that of the electromagnet 17. The bar-supporting arm 15 driven by the control arm 14 finishes its downward movement in the direction of the slider 19. The contact 31 is opened by the arm 15 at the end of its downward movement and the relay 18 ceases to be energised and thus the electromagnet 17 also ceases to be energised. The key 16 consequently passes into the notch 21 of the slider 19 under the action of the return spring 36, thus immobilising the bar-supporting arm 15, while the control arm 14 continues its sinusoidal oscillations.

The same process is repeated as soon as the cam 26 makes another complete revolution, and so on. The sliding bar 8 thus performs square oscillations.

The adjustment of the amplitude of the square oscillations is effected, on the one hand, by operating on the eccentricity of the crank pin 10, as in the case of sinusoidal oscillations, and, on the other hand, by operating the sliders 19 and 20. This latter method of adjustment obviously gives an amplitude of the square oscillations which is less than the amplitude of the corresponding sinusoidal oscillations. The sliders are placed opposite the graduations of the fixed segment 23 corresponding to the desired amplitude. The bar-supporting arm 15 is brought to the upper dead centre corresponding to the desired amplitude, for example by means of a manually controlled lever, and the key 16 then enters the notch 22. Adjustment is completed by shifting the sliders by means of micrometer screws (not shown) and said sliders are then clamped.

The adjustment of the period of the square oscillations is effected by operating on the gear box 2, as in the case of the sinusoidal oscillations. It would also be possible to provide for this purpose a plurality of cams 26 on the wheel 46 which actuate a single contact 28.

The change from the square oscillations to the sinusoidal oscillations is effected in a position in which the two parts of the oscillating arm—the control arm and the bar-supporting arm—are coupled by the key 16 (then engaged in the notch 29 of the arm 14) by engaging the locking device 24 and opening the switch 30.

We claim:

1. A mechanical oscillator comprising: a stationary frame; a first member pivotally mounted on said frame; a second member pivotally mounted on said frame; means for continuously oscillating said first member; means for connecting said first and second members together for simultaneous oscillation of said members; optionally actuatable first means for periodically actuating automatically said connecting means to connect said first member to said second member for single half oscillations only of said second member at intervals separated by an uneven number of half oscillations of said first member; and second means optionally actuatable independently of and alternatively to said first means for continuously maintaining said connecting means connected to said first and second members for continuously locking said two members together for continuous, simultaneous oscillations.

2. A mechanical oscillator comprising: a stationary frame; a first arm pivotally mounted about an axis fixed relative to said frame; driving means for continuously oscillating said first arm sinusoidally; a second arm pivotally mounted about said axis; means for connecting said two arms together against relative movement for oscillating said second arm with said first arm; control means for actuating said connecting means to connect said two arms together against relative movement during at least a part of a single half oscillation of said first arm at time intervals separated by an uneven number of half oscillations of said first arm for moving said second arm in substantially square oscillations, said control means for actuating said connecting means including first means actuatable by said first arm when in a predetermined position relative to said second arm, and second means periodically actuatable by said driving means in timed relation thereto, said control means being actuated only when said first and said second means are simultaneously actuated; and means for deactuating said connecting means at the end of each half oscillation of said second arm to disconnect said arms, said means for deactuating said connecting means being actuatable by said second arm at the end of each half oscillation thereof, and other means operable independently of said control means for continuously maintaining said connecting means connected to said first and second arms for continuously locking said two arms together, whereby said second arm may be subjected to substantially square oscillations when periodically connected to said first arm, and to sinusoidal oscillations when continuously connected to said first arm.

3. A mechanical oscillator comprising: a stationary frame; a first arm pivotally mounted about an axis fixed relative to said frame; driving means for continuously oscillating said first arm sinusoidally; a second arm pivotally mounted about said axis; means for connecting said two arms against relative movement for oscillating said second arm with said first arm; control means for actuating said connecting means to periodically connect said two arms together against relative movement for subjecting said second arm to substantially square oscillation, said control means including electromagnetic means for actuating said connecting means to connect said two arms against relative movement during a single half oscillation of said first arm; cam means driven by and in timed relation with said driving means; electrical contact means periodically actuated by said cam means; electrical switch means carried by one of said arms, and means carried by the other of said arms cooperating with said switch means for actuation thereof when said arms are in a predetermined relative position with respect to each other, said electrical contact means and said switch means being periodically actuated simultaneously to complete an electrical circuit for energizing said electromagnetic means; and means actuated by said second arm at the end of a half oscillation thereof to interrupt said electrical circuit for deactuating said electromagnetic means to disconnect said arms; and other means operable independently of said control means for continuously maintaining said connecting means connected to said first and second arms for continuously locking said two arms together, whereby said second arm may be subjected to substantially square oscillations when said control means is actuated and to sinusoidal oscillations when said other means is actuated.

4. A mechanical oscillator as defined in claim 1 wherein said connecting means is mounted on said second member and including means mounted on said frame engaging said connecting means to lock said second member to said frame at the end of each half oscillation of said second member.

5. A mechanical oscillator as defined in claim 1 including: first means for varying said period of oscillation of said second member when said second member is periodically connected to said first member for substantially square oscillations thereof and second means for varying said period of said substantially square oscillations of said second member.

6. Oscillator according to claim 2, wherein said driving means comprise a rotating plate driven at constant speed and provided with an eccentric crank pin, a fork between whose sides said crank pin is engaged, a slide on which said fork is fixed and a link articulated at one of its ends to said slide and at the other end to said first arm.

7. A mechanical oscillator according to claim 2, including means for adjusting the amplitude of the sinusoidal oscillations of said first arm and means for adjusting the period of the sinusoidal oscillations of said first arm.

8. A mechanical oscillator according to claim 2, including means for adjusting the amplitude of the substantially square oscillations of said second arm.

9. A mechanical oscillator as defined in claim 2 including: a pair of holding elements adjustably connected to said frame along an arc of a circle whose center is located co-axially with said axis; and means for locking said second arm to one of said holding elements at the end of each half oscillation thereof during square oscillating movement of said second arm.

10. A mechanical oscillator as defined in claim 2 including: means for varying the time intervals of said substantially square oscillations of said second arm.

11. A mechanical oscillator as defined in claim 2 including: means for actuating said control means to interrupt said connecting means connecting said two arms against relative movement prior to completion of a half oscillation of said first arm.

References Cited in the file of this patent

UNITED STATES PATENTS

| | | |
|---|---|---|
| 666,875 | Reeves | Jan. 29, 1901 |
| 771,928 | Persson | Oct. 11, 1904 |
| 1,385,145 | Myers | July 19, 1921 |
| 1,432,229 | Anderson | Oct. 17, 1922 |
| 1,609,716 | Holden | Dec. 7, 1926 |
| 2,787,465 | De La Motte | Apr. 2, 1957 |

FOREIGN PATENTS

| | | |
|---|---|---|
| 232,539 | Germany | Mar. 16, 1911 |